April 15, 1952 H. W. BEAVER 2,593,383
PEANUT HARVESTING APPARATUS
Filed Jan. 5, 1949 4 Sheets-Sheet 1

HARTSELL W. BEAVER,
INVENTOR.

BY

ATTORNEY

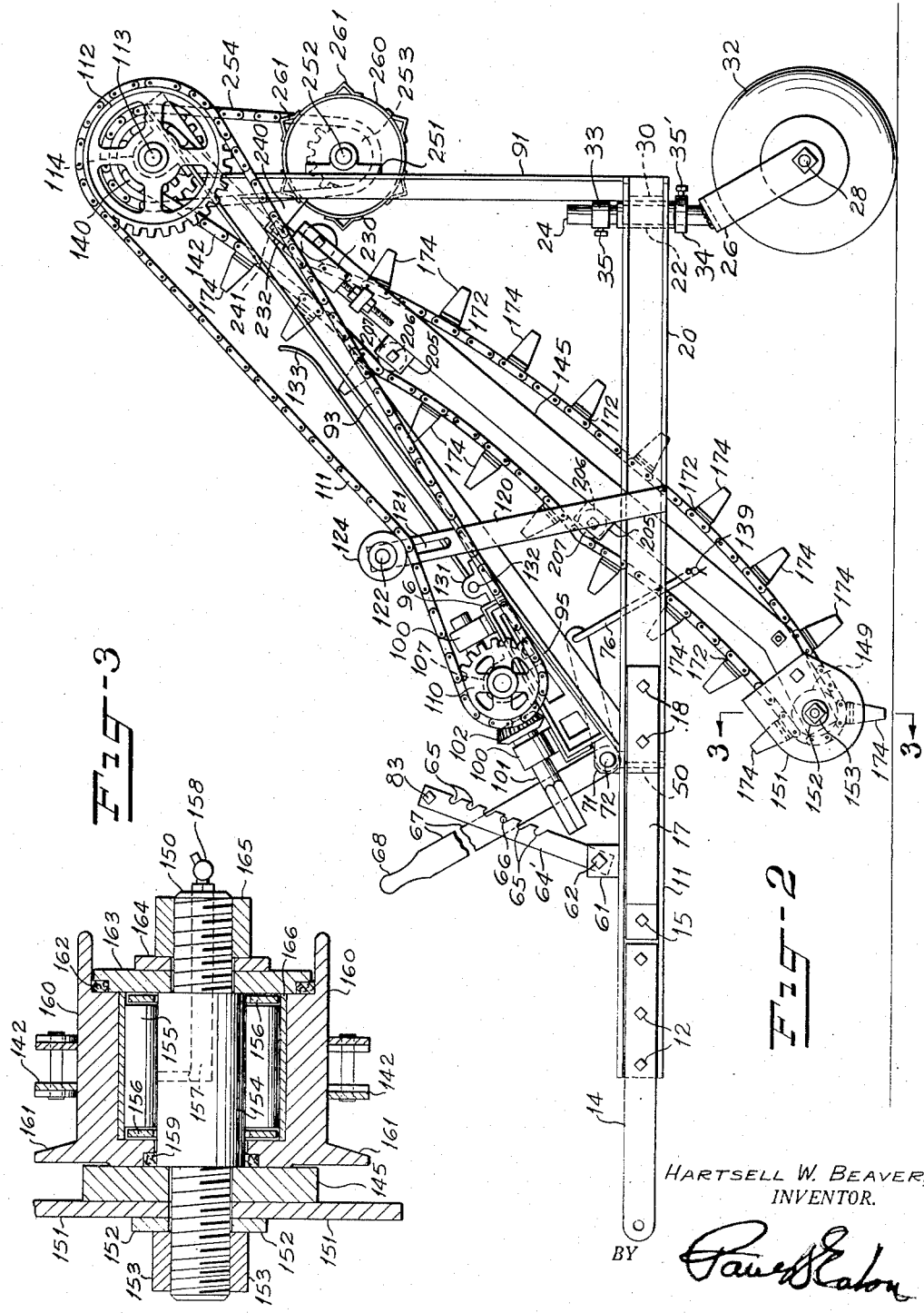

April 15, 1952
H. W. BEAVER
2,593,383
PEANUT HARVESTING APPARATUS
Filed Jan. 5, 1949
4 Sheets-Sheet 3
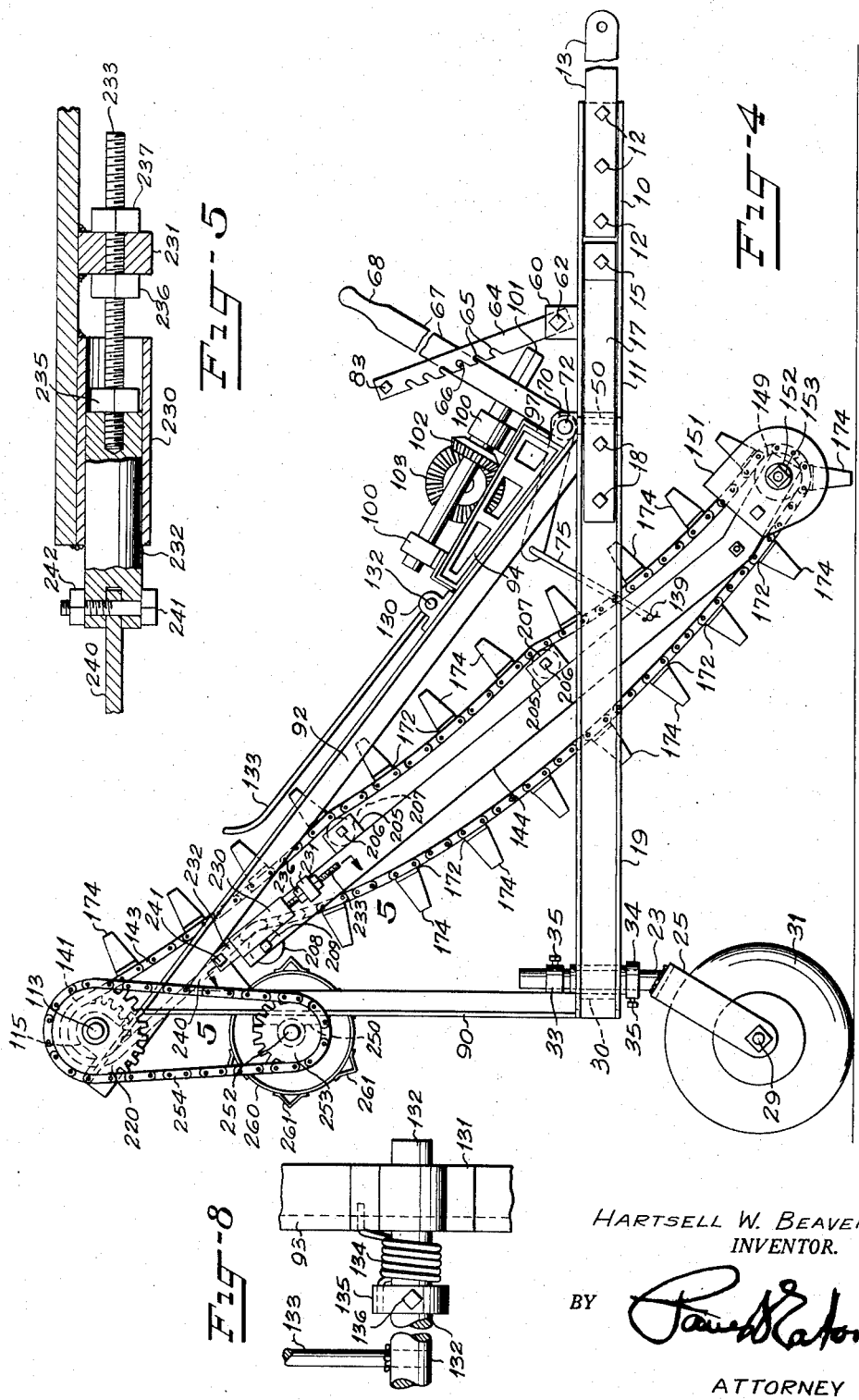
HARTSELL W. BEAVER,
INVENTOR.
BY
ATTORNEY April 15, 1952     H. W. BEAVER     2,593,383
PEANUT HARVESTING APPARATUS Filed Jan. 5, 1949     4 Sheets-Sheet 4

HARTSELL W. BEAVER,
INVENTOR.

BY

ATTORNEY

Patented Apr. 15, 1952

2,593,383

UNITED STATES PATENT OFFICE 2,593,383

PEANUT HARVESTING APPARATUS

Hartsell W. Beaver, Blakely, Ga., assignor to Turner Manufacturing Company, Statesville, N. C., a corporation of North Carolina Application January 5, 1949, Serial No. 69,279

3 Claims. (Cl. 56—327)

This application is an improvement in my patent application Serial Number 584,402, filed March 23, 1945, entitled Peanut Harvester, now matured into Patent No. 2,452,305.

This invention relates to an improved peanut harvester wherein means are provided for picking up from the ground loose vegetation and relates more specifically to an improved elevating conveyor having specially designed teeth mounted on this elevating conveyor for picking up loose peanut plants from the ground which have already been removed from the ground.

It is an object of this invention to provide a wheeled framework having an upwardly extending endless elevating conveyor mounted thereon and said conveyor having a plurality of teeth extending therefrom, and the lower portion of the conveyor being adapted to be disposed in close proximity to the ground whereby loose peanut vines which have been previously upturned by a plow or the like, may be picked up by the teeth and elevated by the elevating conveyor and then dumped at the rear portion of the wheeled framework.

It is another object of this invention to provide in combination with the elevating conveyor a kicker drum for separating adhering soil from the peanut vines and the peanuts carried thereby.

It is another object of this invention to provide means whereby the distance between the lower end of the elevating conveyor and the ground may be regulated, as desired.

Some of the objects of the invention having been stated, other objects will appear as the description proceeds when taken in connection with the accompanying drawings, in which:

Figure 2 is a side elevation showing the left-hand side of the apparatus;

Figure 3 is a vertical sectional view on an enlarged scale and is taken along the line 3—3 in Figure 2;

Figure 4 is a side elevation showing the right-hand side of the wheeled framework;

Figure 5 is a vertical sectional view taken along the line 5—5 in Figure 4;

Figure 8 is an enlarged vertical sectional view showing the tension means associated with the fingers which rest on the vegetation being elevated by the elevating conveyor.

Figure 1:
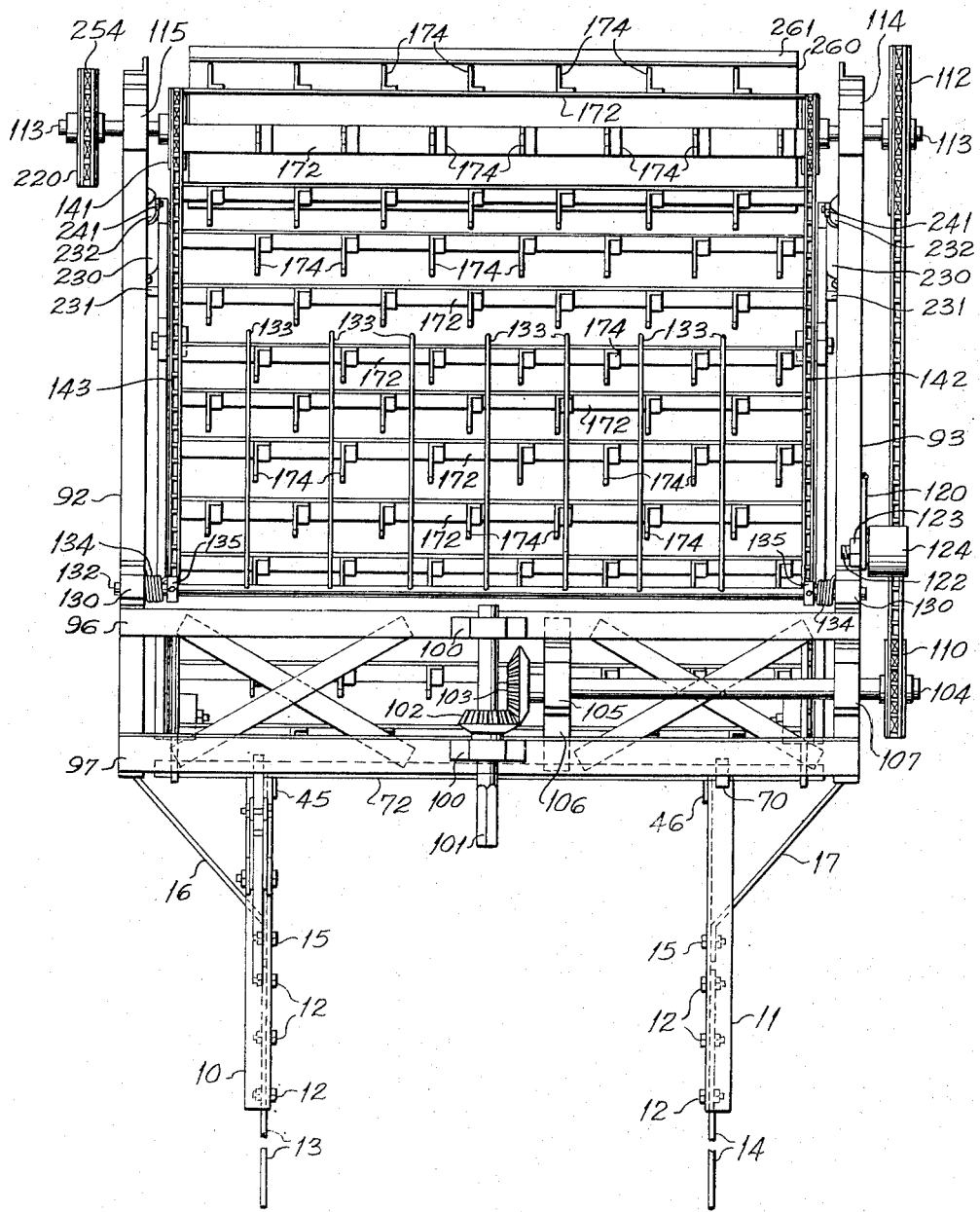
Figure 1 is a top plan view of the apparatus.

Referring more specifically to the drawings, the numerals 10 and 11 indicate right-hand and left-hand longitudinally extending frame bars, respectively, to which are secured, as by bolts 12, right-hand and left-hand longitudinally extending draw bars 13 and 14, respectively. The front ends of these bars 13 and 14 have suitable holes therein by means of which they may be secured to two spaced points on a tractor, in the manner shown in the aforesaid patent application, or in any other suitable manner.

Secured to these frame bars 10 and 11, as by bolts 15 are outwardly diverging right-hand and left-hand frame members 16 and 17 to which are secured as by bolts 18 parallel right-hand and left-hand longitudinally extending channel bars 19 and 20, respectively. Secured to and spanning the distance between the rear ends of the members 19 and 20 is a suitable frame bar 30. Secured in these longitudinal channel bars 19 and 20 are suitable tubular bearing members 21 and 22, respectively, in which are oscillatably disposed shafts 23 and 24, respectively, and the lower ends of these shafts 23 and 24 are forked as at 25 and 26, respectively, and the lower ends of these forked portions 25 and 26 have suitable axles 27 and 28, respectively, mounted therein. Mounted on these axles 27 and 28 are suitable ground wheels 31 and 32, respectively, for supporting the wheeled framework. Suitable collars 33 and 34 are disposed on the shafts 23 and 24 above and below the bearing members 21 and 22, respectively, and are secured to the shafts 23 and 24 as by set screws 35 and 35', respectively. Secured to the rear ends of the longitudinally extending members 10 and 11 as by spot welding, are angle brackets 45 and 46, respectively, and these angle brackets 45 and 46, as well as the rear ends of the longitudinally extending members 10 and 11, are spot welded to a horizontally disposed transverse frame member 50, and the outer ends of this frame member 50 are spot welded to the longitudinally extending channel bars 19 and 20.

Welded to and rising upwardly from the frame member 50 is an upright U-shaped bracket 60 and a bolt 62 penetrates the member 60. Uprising spaced bars 64 and 64' are pivotally mounted at their lower ends on the bolt 62 and these uprising bars 64 and 64' have a plurality of notches 65 therein into which a suitable pin 66 is adapted to fit, this pin 66 being mounted in and projecting from both sides of a lever 67 which is disposed between the bars 64 and 64' and has a handle portion 68 at the upper end thereof. The bars 64 and 64' are secured together at their upper ends by a bolt 83.

Suitably secured to the upper side of the frame member 50 are upright bearing brackets 70 and 71 in which is oscillatably mounted a shaft 72 and the lever 67 is fixedly secured at its lower end on the shaft 72. The shaft 72 has two rearwardly projecting levers secured near the outer ends thereof which have pivotally mounted in the free ends thereof links 75 and 76 the lower ends of which are connected to the side frame members of the elevating conveyor to be later described.

Rising upwardly from the rear ends of the channel bars 19 and 20, and at right angles thereto, are suitable upright angle bars 90 and 91, respectively, which extend upwardly and have welded to their upper ends suitable diagonally disposed downwardly and forwardly extending channel members 92 and 93, respectively, and the lower forward ends of these diagonal channel members 92 and 93 are welded to the channel members 19 and 20. It will be noted that the upper ends of the bars 92 and 93 extend rearwardly beyond the point of connection with bars 90 and 91.

Suitably secured to the upper surfaces of the diagonally disposed frame members 92 and 93 are suitable support members 94 and 95, to which are secured as by spot welding horizontally disposed spaced angle bars 96 and 97. Mounted on the angle bars 96 and 97 are suitable bearing blocks 100, in which a suitable shaft 101 is rotatably mounted (Figures 1, 3, 4 and 6). The front end of the shaft 101 is squared and is adapted to be connected to the power take-off of a suitable prime mover in the manner shown in the aforesaid patent application.

Figure 6:
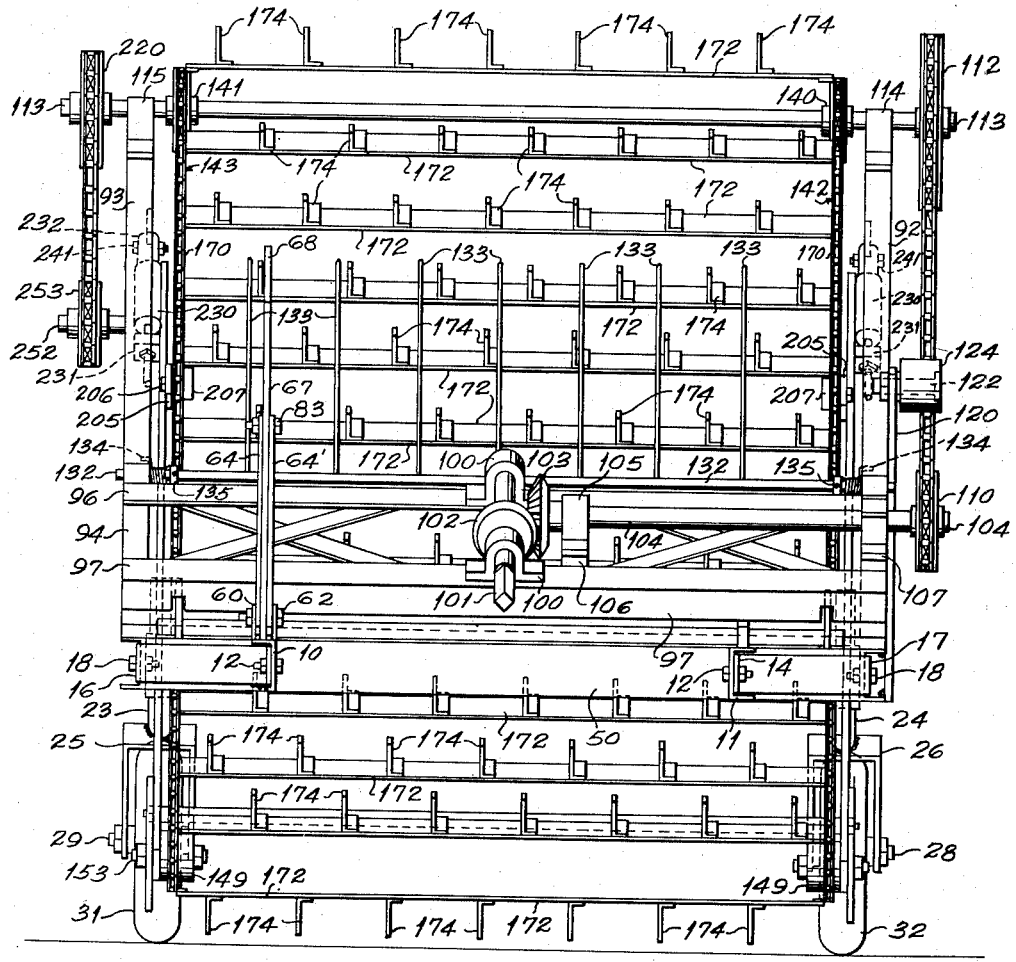
Figure 6 is a front elevation of the apparatus.

Secured on the upper end of the shaft 101 is a bevel gear 102, and this bevel gear 102 is adapted to mesh with a larger bevel gear 103 mounted on a suitable horizontally disposed shaft 104 mounted near one end in a bearing block 105 which is mounted on a bar 106 welded to and extending between the angle bars 96 and 97 (Figures 1 and 6). The right-hand end of this shaft 104 in Figure 6 is mounted in a bearing block 107 supported by support member 95 and the shaft 104 extends outwardly beyond the bearing block 107 and has fixedly mounted thereon a sprocket wheel 110. Mounted on the sprocket wheel 110 is a sprocket chain 111 which extends upwardly and is mounted on a sprocket wheel 112 fixedly mounted on a rotatable shaft 113 mounted in bearing blocks 114 and 115 mounted on the diagonally disposed frame members 92 and 93, respectively.

Welded to the longitudinally extending channel bar 20 is an upwardly extending bar 120, the upper end of which has a closed slot 121 therein and a shoulder bolt 122 is adjustably secured in this slot and has an idler roller 124 mounted thereon, the bolt 122 having a nut 123 for holding the roller 124 in adjusted position to apply pressure on the upper reach of the sprocket chain 111 at all times to take up excess slack therein.

Secured to each of the upwardly extending diagonal frame members 92 and 93 are bearings 130 and 131, respectively, in which is oscillatably mounted a shaft 132, and this shaft 132 has secured thereto a plurality of upwardly extending pressure fingers 133, the lower ends of these fingers being turned in a direction away from the elevating conveyor, to be later described, and these levers 133 are adapted to exert pressure on the vegetation which is being elevated by the elevating conveyor, since the free ends of the fingers 133 are urged toward the upper reach of the elevating conveyor by a torsion spring 134 disposed around the shaft 132 and having one end anchored in the angle bar 93 and its other end suitably anchored in an adjustable collar 135 adjustably secured on the shaft 132 as by a set screw 136.

Fixedly secured intermediate the ends of the shaft 113 and disposed between the frame members 92 and 93 are sprocket wheels 140 and 141, on which are mounted sprocket chains 142 and 143, respectively.

It will be noted that the lower ends of the links 75 and 76 are bent laterally as at 139 at their lower ends and project through holes in the right-hand and left-hand side frame members 144 and 145 of the elevating conveyor, to be presently described. These side frame members 144 and 145 are disposed between the channel members 19 and 20 and each of the side frame members has secured to the lower end thereof a bearing broadly indicated at 149, a detail of which is shown in Figure 3.

Each of the bearings 149 comprises a shouldered shaft 150 threaded at each end, one end of which is adapted to penetrate its associated side frame member of the elevating conveyor and this threaded shaft 150 also penetrates a suitable shield 151, mounted on the outer sides of and adjacent the side frame member of the elevating conveyor. Mounted to the outer surface of each shield 151 is a suitable washer 152 which is also penetrated by the threaded shaft 150 and the threaded shaft 150 has a nut 153 disposed on the extreme left-hand end thereof in Figure 3 to secure it to its associated frame bar.

Disposed adjacent the right-hand side in Figure 3 of the side frame member 144 of the elevating conveyor is a suitable bearing portion 154 and rollers 155 are adapted to rotate on this bearing portion 154. The bearing portion 154 has also loosely fitted therearound washers 156 and 157 at each end of the rollers 155. The threaded shaft 150 has a suitable lubricant passageway 157 disposed in the center thereof and this lubricant passageway 157 extends through the bearing portion 154 and communicates with the rollers 155. A suitable grease fitting 158 is mounted in the right-hand end of the lubricant passageway in Figure 3, and it is thus seen that lubricant may be applied to the roller bearings 155 through the lubricant passageway 157.

Rotatably mounted on the rollers 155 is a suitable pulley 160 having an out-turned annular flange 161 at its left-hand end in Figure 3 and packing glands 162 and 159 are provided to prevent the escape of lubricant from the bearing. Fitting against the right-hand end of the bearing portion 154 in Figure 3 is a lubricant sealing ring 163, and a washer 164 is penetrated by the bolt 150 and engages the right-hand portion of the lubricant sealing ring 163. A nut 165 is threaded onto the extreme right-hand end of the threaded bolt 150, thereby completing the structure of the bearing 149. The pulley 160 has a suitable tubular liner 166 secured therein, as by a pressed fit.

Figure 7:
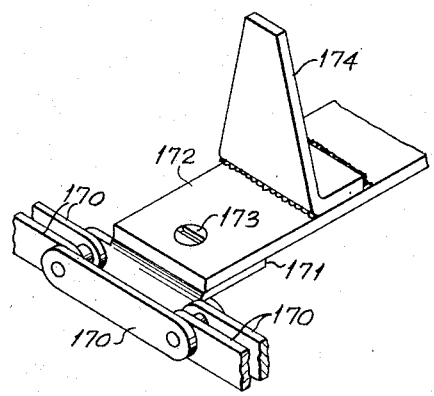
Figure 7 is an enlarged detail showing one of the teeth which picks up the loose vegetation from the ground and showing the manner in which it is secured to the elevating conveyor.

The sprocket chains 142 and 143 which are mounted at their upper ends on the sprocket wheels 140 and 141, pass around the pulley 160 at their lower ends, and, as will be noted in Figure 7, each of the sprocket chains 142 and 143 is comprised of a plurality of links 170 and certain spaced links are each provided with a right angular portion 171 to which is secured a horizontally disposed metallic bar 172, as by a screw 173. It will be noted in Figure 6 that the bars 172 span the distance between the conveyor chain 142 and the conveyor chain 143 and each of the bars 172 is connected at opposite ends to these conveyor chains.

Welded by a clean weld to each of the bars 172 is a plurality of right-angularly shaped teeth 174 and it will be noted that the width of the free end of each tooth 174 is less than the width of the base portion of the tooth, since the two sides of each tooth converge toward each other. As a result of the teeth 174 being welded by a clean weld to the bars 172, it is impossible for vegetation to be snagged by a tooth and become imbedded on the same, but the vegetation will merely rest by gravity on the teeth 174. Due to the shape of the teeth 174, they easily shed the peanut plants nested therearound.

It is obvious that as the shaft 101 is turned in a clockwise direction in Figure 6, rotation will be transmitted to the shaft 104 in a clockwise direction in Figure 4 through the bevel gears 102 and 103 which will transmit rotation to the sprocket wheel 110 in a clockwise direction in Figure 4, and thus clockwise rotation will be imparted to the sprocket wheel 112 through the sprocket chain 111 in Figure 2. This will thereby transmit rotation to the shaft 113 in a clockwise direction in Figure 2, which will cause the sprocket wheels 140 and 141 to rotate in a clockwise direction in Figure 2, and this will cause the lower reaches of the sprocket chains to move downwardly toward the ground in Figure 2. It is thus seen that the teeth 174 on the bars 172 will be caused to move downwardly toward the ground with the lower reach of the conveyor chains 142 and 143, and will pick up vegetation from the ground and will then travel upwardly with the upper reach of the conveyor chains 142 and 143 after the same have passed around the pulleys 160 at the lowermost point of their travel. It is thus seen that vegetation will be elevated by the teeth 174 as the conveyor chains travel in a clockwise direction in Figure 2.

It is manifest that the position of the elevating conveyor relative to the ground may be regulated by placing the pin 66 on the lever 67 in any desired notch 65 in the arms 64 and 64' in the manner heretofore described, for the reason that as the position of the lever 67 is changed, the links 75 and 76 will be moved, thereby moving the side frame members 144 and 145.

It will be noted that each of the side frame members 144 and 145 of the elevating conveyors has a pair of uprising ears 205 secured thereto in which are mounted stub shafts 206 on which are mounted suitable idler pulleys 207 on which the conveyor chains 142 and 143 are adapted to ride. The shafts 206 are secured in position by having nuts, not shown, threaded on their inner ends.

It will be noted that each of the side frame members 144 and 145 of the elevating conveyor has welded to its upper end a tubular member 230 and also has an ear 231 welded thereto which is spaced slightly to the right of the tubular member 230 in Figure 5. Mounted within the tubular member 230 is a sliding shaft 232 and a suitable threaded shaft 233 is adapted to penetrate the ear 231 and to threadably penetrate the lower end of the shaft 232. A suitable lock nut 235 is threaded on the threaded shaft 233 to lock the shaft 233 in fixed position relative to the shaft 232. Disposed on the left-hand side in Figure 5 of the ear 231 is a lock nut 236 and disposed on the right-hand side of the ear 231 is a lock nut 237, and it is thus seen that by means of the lock nuts 235, 236 and 237, the threaded shaft 233 is held in adjusted position. The upper end of the shaft 232 is notched and has a plate member 240 disposed in this notched portion. A bolt 241 penetrates the upper end of the shaft 232 and also the plate 240 and has a nut 242 threaded on its upper end in Figure 5. It will be noted in Figures 2 and 4 that the plates 240 are welded to the interior surfaces of the angle bars 92 and 90 on the right-hand side of the wheeled framework and the angle bars 91 and 93 on the left-hand side of the framework. It is thus seen that through adjustment of the threaded bolt 233 in the shaft 232 disposed within the tubular member 230, the distance between the upper ends of the side frame members 144 and 145 of the elevating conveyor and the plates 240 may be regulated, thereby allowing for regulation of the tautness of the conveyor chains 142 and 143.

Idler pulleys 208 (Figures 2 and 4) are rotatably mounted on stub shafts 209 secured adjacent the upper ends of side frame members 144 and 145 and support the lower reaches of conveyor chains 142 and 143.

As is seen in Figures 1 and 6, the shaft 113 extends beyond the bearing member 115 at its left-hand end and has fixedly secured thereon a sprocket wheel 220. Secured to the uprising angle bars 90 and 91 are bearings 250 and 251, respectively, and a shaft 252 is mounted in these bearing blocks 250 and 251. A sprocket wheel 253 is mounted on the shaft 252 and a sprocket chain 254 is adapted to pass around the sprocket wheel 253 on the shaft 252 at its lower end. The shaft 252 has a large circular drum 260 fixedly secured thereon and the exterior surface of the drum 260 has a plurality of right-angularly shaped members 261 secured thereto which form a plurality of projections on the exterior surface of the drum 260.

Now, in operation, the squared shaft 101 will be caused to rotate in a clockwise direction in Figure 6, as previously described, and rotation in a clockwise direction in Figure 2 will be transmitted to the shaft 113 as previously described, and the elevating conveyor chains will be caused to move downwardly and upwardly, as heretofore described, to thereby elevate vegetation from the ground in the manner heretofore described. Now, as the shaft 113 rotates in a clockwise direction in Figure 2, the sprocket wheel 220 mounted on the shaft 113 will be caused to rotate in a like direction and thereby the sprocket wheel 253 will be caused to rotate in a clockwise direction in Figure 2, through the sprocket chain 254. It is thus seen that the drum 260 will be rotated in a counterclockwise direction in Figure 4, which will cause the projections 261 on the drum 260 to travel in a direction opposite to the direction of travel of the teeth 174 on the lower reach of the elevating conveyor.

Now, as a row of teeth 174 reaches the uppermost point of their travel, that is around the sprocket wheels 140 and 141, the vegetation will be caused to drop off the teeth 174 to the right in Figure 2. Now, any vegetation which may still be disposed on the teeth 174 as the teeth begin their downward movement, will be engaged by the projections 261 on the drum 260, and it is thus seen that all vegetation which does not fall off the teeth 174 by gravity as they pass the uppermost point of their travel, will be engaged by the projections 261 and thereby forced off the teeth 174. This drum 260 with the projections 261 thereon thereby prevents any vegetation from being carried back with the teeth 174 to the lowermost point of travel of the teeth 174.

The vegetation as it is discharged from the teeth 174 and the projections 261 on the drum 260, will fall by gravity onto any suitable support, such as that shown in the aforesaid patent application, or into a suitable container, not shown.

It is thus seen that there has been provided a means for picking up loose vegetation from the ground and elevating it by an elevating conveyor and then discharging it onto a suitable platform or container mounted on the wheeled carriage.

In the drawings and specifications there has been set forth a preferred embodiment of the invention, and although specific terms are employed, they are used in a generic and descriptive sense only, and not for purposes of limitation, the scope of the invention being defined in the claims.

I claim:

1. An improvement in apparatus for picking up vegetation from the ground, such as peanut vines which have been excavated from the ground having a wheeled frame provided with an endless conveyor inclined upwardly and rearwardly and having its lower front end adjacent the ground over which the wheeled frame travels, said conveyor having a pair of spaced sprocket chains and a plurality of transverse bars extending between the sprocket chains and each bar having a plurality of teeth secured thereto, said improvement comprising each tooth being L-shaped to provide a base portion and a piercing portion, the piercing portion having two opposed side edges sloping towards each other at identical acute angles and each tooth having its outer end parallel to the base portion to provide a truncated isosceles triangle.

2. An improvement in apparatus for picking up vegetation from the ground such as peanut vines which have been excavated from the ground having a main frame and having a superstructure mounted on said frame and also having an endless conveyor frame pivotally mounted in the upper portion of the superstructure and extending downwardly and forwardly, said apparatus also having means carried by the main frame for adjusting the height of the front end of the conveyor frame relative to the ground over which the main frame is traveling, said conveyor frame having mounted therein an endless conveyor comprising a pair of spaced sprocket chains and a plurality of transversely disposed bars secured at their ends to the sprocket chains and each bar having a plurality of spaced outwardly projecting teeth secured thereto, said improvement comprising the teeth being in the form of a truncated isosceles triangle to thereby assist in shedding of all vegetation therefrom.

3. An improvement in an apparatus for picking up loose vegetation on the ground such as peanut vines which have been excavated from the ground, having a main frame and a superstructure mounted on the mainframe and having a shaft rotatably mounted in the uppermost portion thereof and having a pair of side bars pivoted at their upper ends on said superstructure and extending downwardly and forwardly and having a pair of sprocket wheels mounted on said shaft and an idler pulley mounted in the lower end of each of said side bars and having sprocket chains mounted on each of the two sprocket wheels on the said shaft at their upper ends and mounted on the idler pulleys in the lower ends of said side bars and having means for adjusting the position of the lower ends of the side bars relative to the ground, said improvement comprising each of said sprocket chains having a plurality of spaced transversely disposed bars secured thereto and each bar having a plurality of spaced outwardly extending tapered blunt ended teeth thereon, each tooth having a base portion secured to the bar and disposed at right angles to the teeth, and each of the side edges of the teeth defining identical acute angles with the base portion thereof whereby rotation of the conveyor to cause its upper and forward reach to move upwardly will cause the teeth to pick up vegetation from the ground and convey it upwardly and rearwardly relative to the main frame as it travels over the ground.

HARTSELL W. BEAVER.

REFERENCES CITED

The following references are of record in the file of this patent:

UNITED STATES PATENTS

| Number | Name | Date |
| --- | --- | --- |
| 43,964 | Atwater | Aug. 30, 1864 |
| 660,944 | Bowen | Oct. 30, 1900 |
| 669,908 | Williams | Mar. 12, 1901 |
| 972,910 | Pippen | Oct. 18, 1910 |
| 1,251,425 | Rogers et al. | Dec. 25, 1917 |
| 1,313,880 | Clausen | Aug. 26, 1919 |
| 1,319,724 | Pelton | Oct. 28, 1919 |
| 2,361,304 | Mappin | Oct. 24, 1944 |
| 2,477,389 | Oehler et al. | July 26, 1949 |
| 2,499,051 | Beaver | Feb. 28, 1950 |